US012307922B2

(12) United States Patent
Mattingly

(10) Patent No.: US 12,307,922 B2
(45) Date of Patent: May 20, 2025

(54) ILLUMINATED ADDRESS ASSEMBLY

(71) Applicant: Morris Mattingly, Louisville, KY (US)

(72) Inventor: Morris Mattingly, Louisville, KY (US)

( * ) Notice: Subject to any disclaimer, the term of this patent is extended or adjusted under 35 U.S.C. 154(b) by 235 days.

(21) Appl. No.: 17/944,167

(22) Filed: Sep. 13, 2022

(65) Prior Publication Data

US 2024/0087485 A1 Mar. 14, 2024

(51) Int. Cl.
*G09F 13/00* (2006.01)
*G09F 13/04* (2006.01)

(52) U.S. Cl.
CPC ...... *G09F 13/0413* (2013.01); *G09F 13/0418* (2021.05)

(58) Field of Classification Search
CPC .......... G09F 13/04; G09F 13/005; G09F 7/18; G09F 13/0413; G09F 13/08; G09F 27/004; G09F 27/007; G09F 2007/1852; G09F 2013/0481
See application file for complete search history.

(56) References Cited

U.S. PATENT DOCUMENTS 4,611,265 A 9/1986 Davis
4,765,080 A 8/1988 Conti
4,951,406 A * 8/1990 Lemire .................. G09F 13/14 40/576
5,911,524 A 6/1999 Wilton
10,878,730 B2 * 12/2020 Newcomb ........... G09F 13/0413
11,948,476 B1 * 4/2024 Berg ......................... G06F 3/02
2002/0166272 A1 * 11/2002 Gaymon ................. G09F 13/04 40/574
2020/0361497 A1 * 11/2020 Hoppe .................. H04W 4/023
2021/0117915 A1 * 4/2021 Newcomb ................. G09F 7/00
2021/0118339 A1 * 4/2021 Newcomb ................ G08B 5/38
2021/0183278 A1 * 6/2021 Lai ........................ H04W 88/04
2023/0078887 A1 * 3/2023 Ekeroth ................ G09F 19/227 40/541
2023/0337845 A1 * 10/2023 Glover ................... G08B 5/224
2024/0071265 A1 * 2/2024 Castlen ................. G09F 27/005

FOREIGN PATENT DOCUMENTS

| | | |
|---|---|---|
| CN | 103940505 | 7/2014 |
| GB | 1455173 | 1/1974 |
| JP | 2015503113 | 1/2015 |

* cited by examiner

*Primary Examiner* — Cassandra Davis

(57) ABSTRACT

An illuminated address assembly includes a housing that is attachable to an exterior wall of a building such that the housing is visible to an individual approaching the building. A light emitter is integrated into the housing to emit light outwardly from the housing. A communication unit is integrated into the housing and the communication unit receives a delivery command from a personal electronic device. The light emitter is turned on when the delivery driver passes within a trigger distance of the building to facilitate the delivery driver to visually identify the building as the destination for the delivery. A placard is insertable into the opening in the housing with indicia that is illuminated by the light emitter to facilitate the delivery driver approaching the building to read the address of the building.

7 Claims, 7 Drawing Sheets

ILLUMINATED ADDRESS ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to address devices and more particularly pertains to a new address device for facilitating a delivery driver to clearly read the address of a building. The device includes a housing that is mounted to an exterior wall of a building, a light emitter integrated into the housing and placard with the address of the building which is illuminated by the light emitter when the light emitter is turned on. The device includes a first transceiver that is in communication with a global positioning system and second transceiver that is in communication with a personal electronic device and a delivery driver. The light emitter is turned on when the delivery driver approaches within a trigger distance of the building and the light emitter is turned off when the delivery driver completes the delivery.

(2) Description of Related Art Including Information Disclosed Under 37 CFR 1.97 and 1.98

The prior art relates to address devices including a variety of illuminated address signs that can be attached to an exterior wall of a building. The prior art discloses an illuminated address sign that includes a motion sensor to turn on the illuminated address sign with a person approaches the illuminated address sign. In no instance does the prior art disclose an illuminated address sign that is in wireless communication with an extrinsic communication network and a global positioning system.

BRIEF SUMMARY OF THE INVENTION

An embodiment of the disclosure meets the needs presented above by generally comprising a housing that is attachable to an exterior wall of a building such that the housing is visible to an individual approaching the building. A light emitter is integrated into the housing to emit light outwardly from the housing. A communication unit is integrated into the housing and the communication unit receives a delivery command from a personal electronic device. The light emitter is turned on when the delivery driver passes within a trigger distance of the building to facilitate the delivery driver to visually identify the building as the destination for the delivery. A placard is insertable into the opening in the housing with indicia that is illuminated by the light emitter to facilitate the delivery driver approaching the building to read the address of the building.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
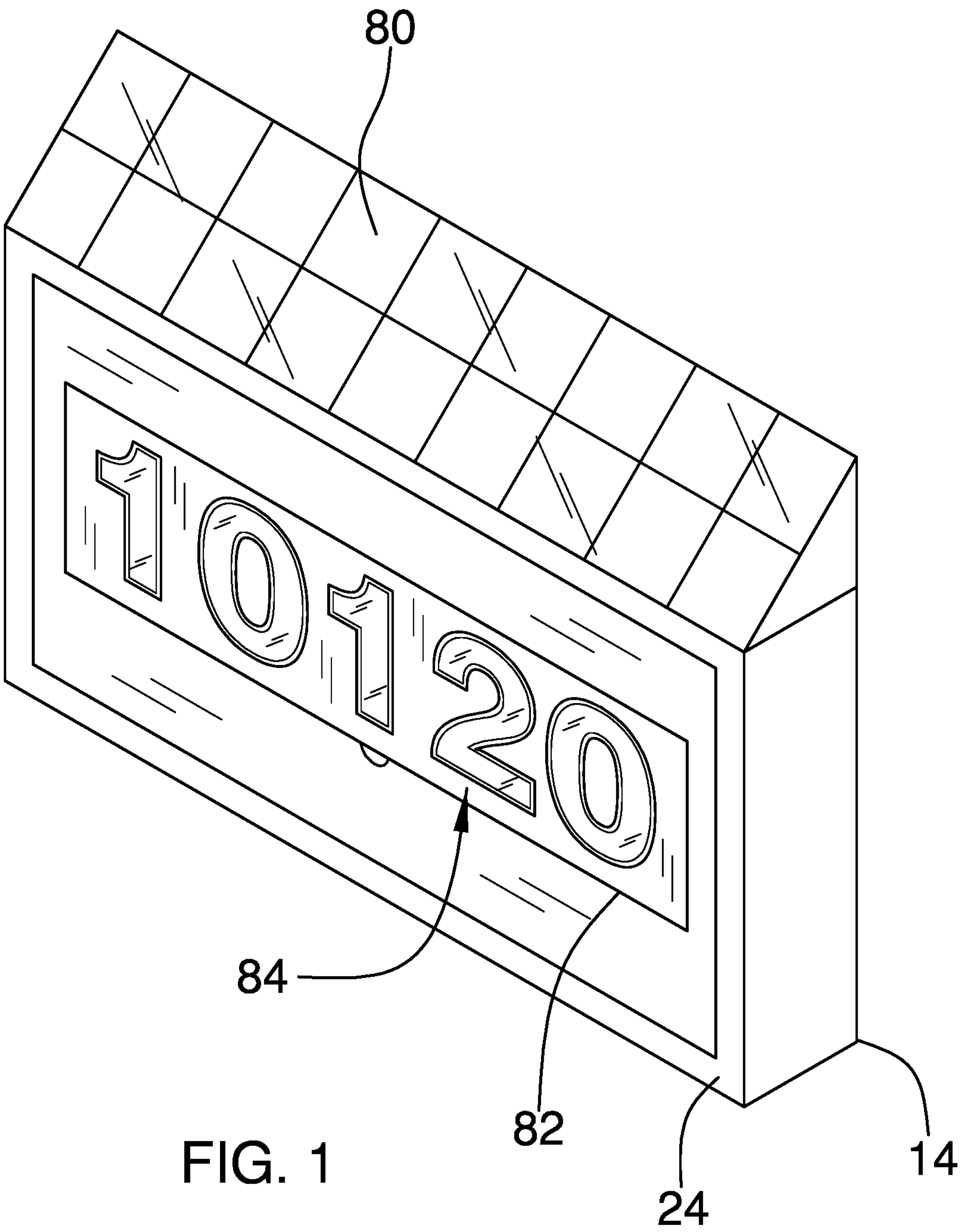
FIG. 1 is a front perspective view of an illuminated address assembly according to an embodiment of the disclosure.
Figure 2:
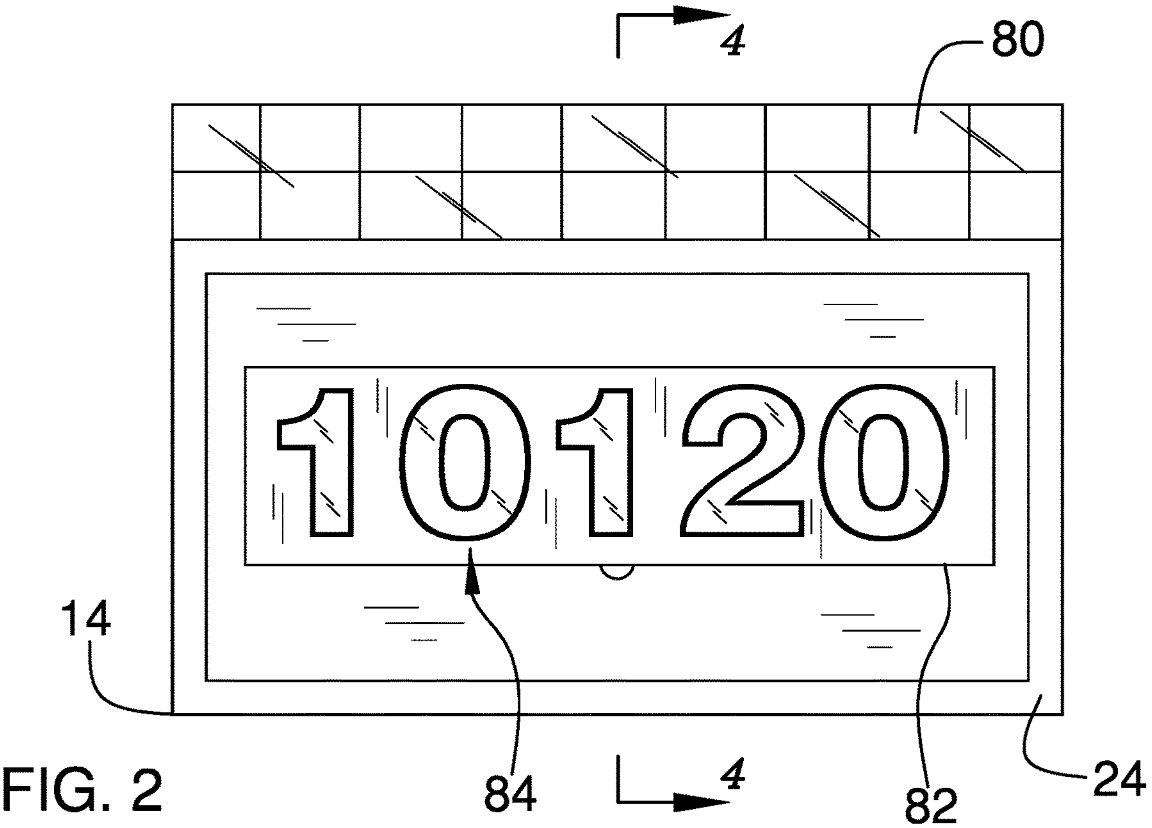
FIG. 2 is a front view of an embodiment of the disclosure.
Figure 3:
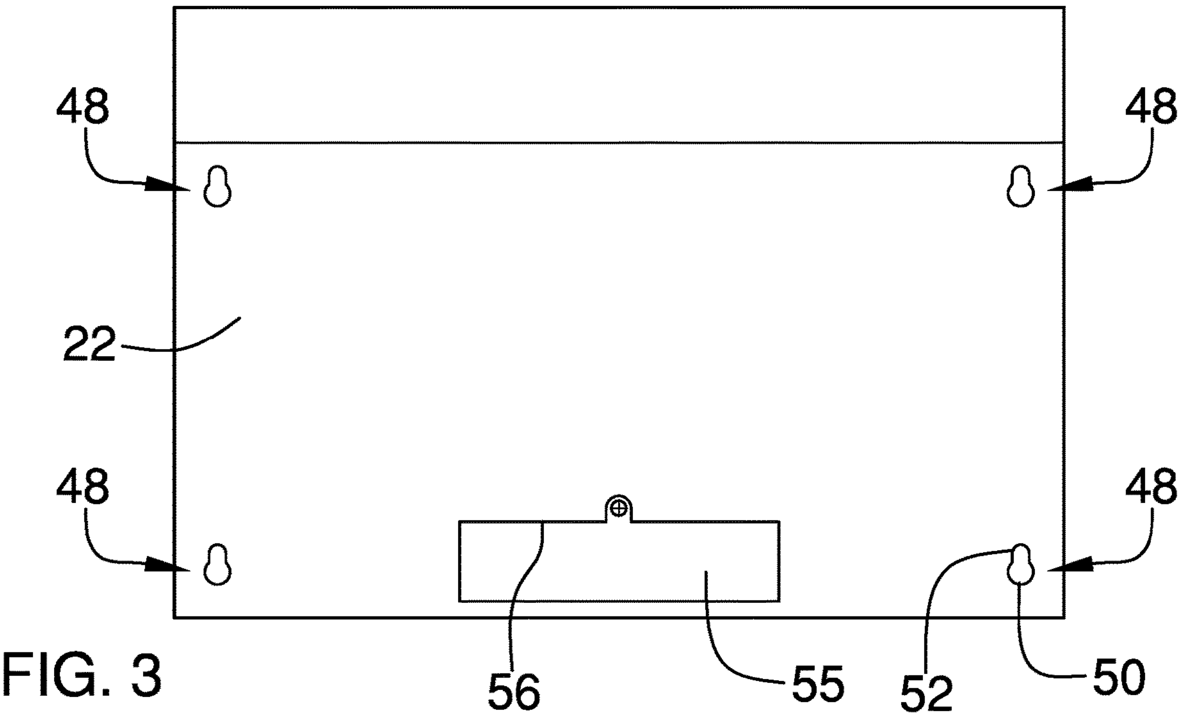
FIG. 3 is a back view of an embodiment of the disclosure.
Figure 4:
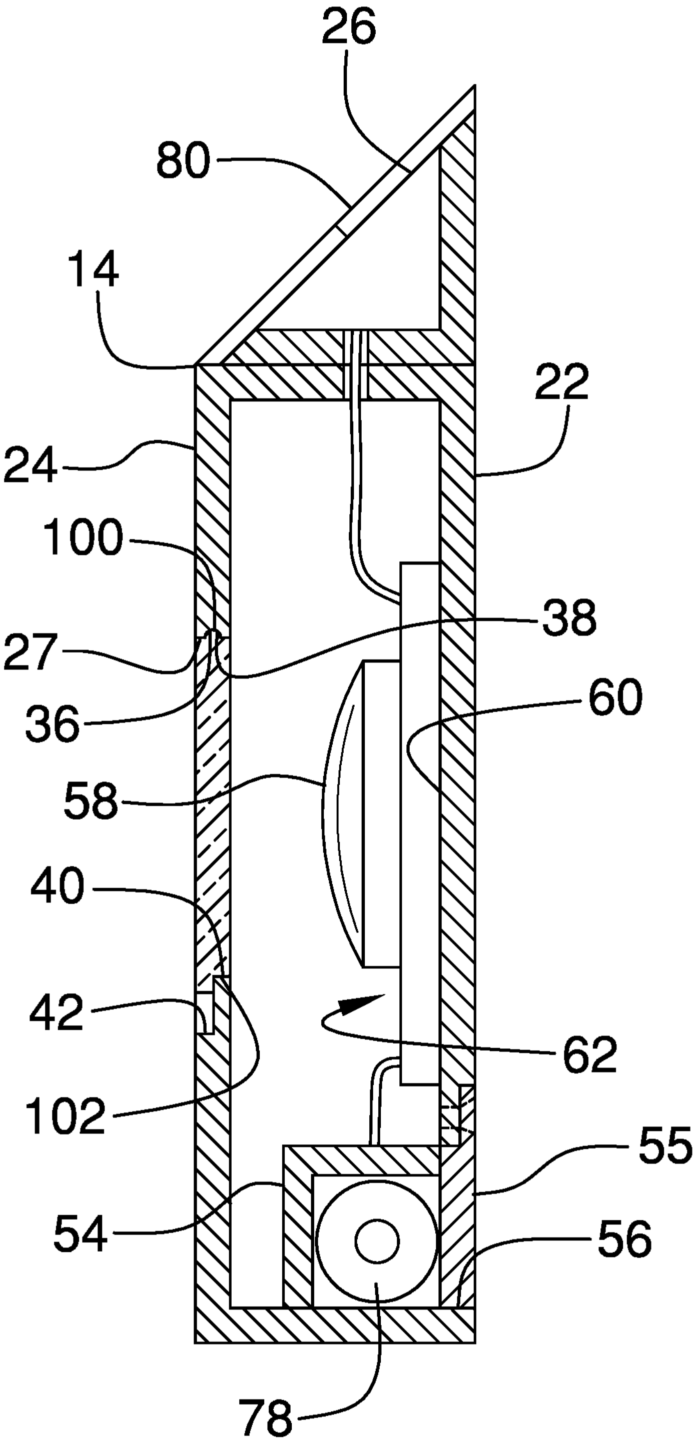
FIG. 4 is a cross sectional view taken along line 4-4 of FIG. 2 of an embodiment of the disclosure.
Figure 5:
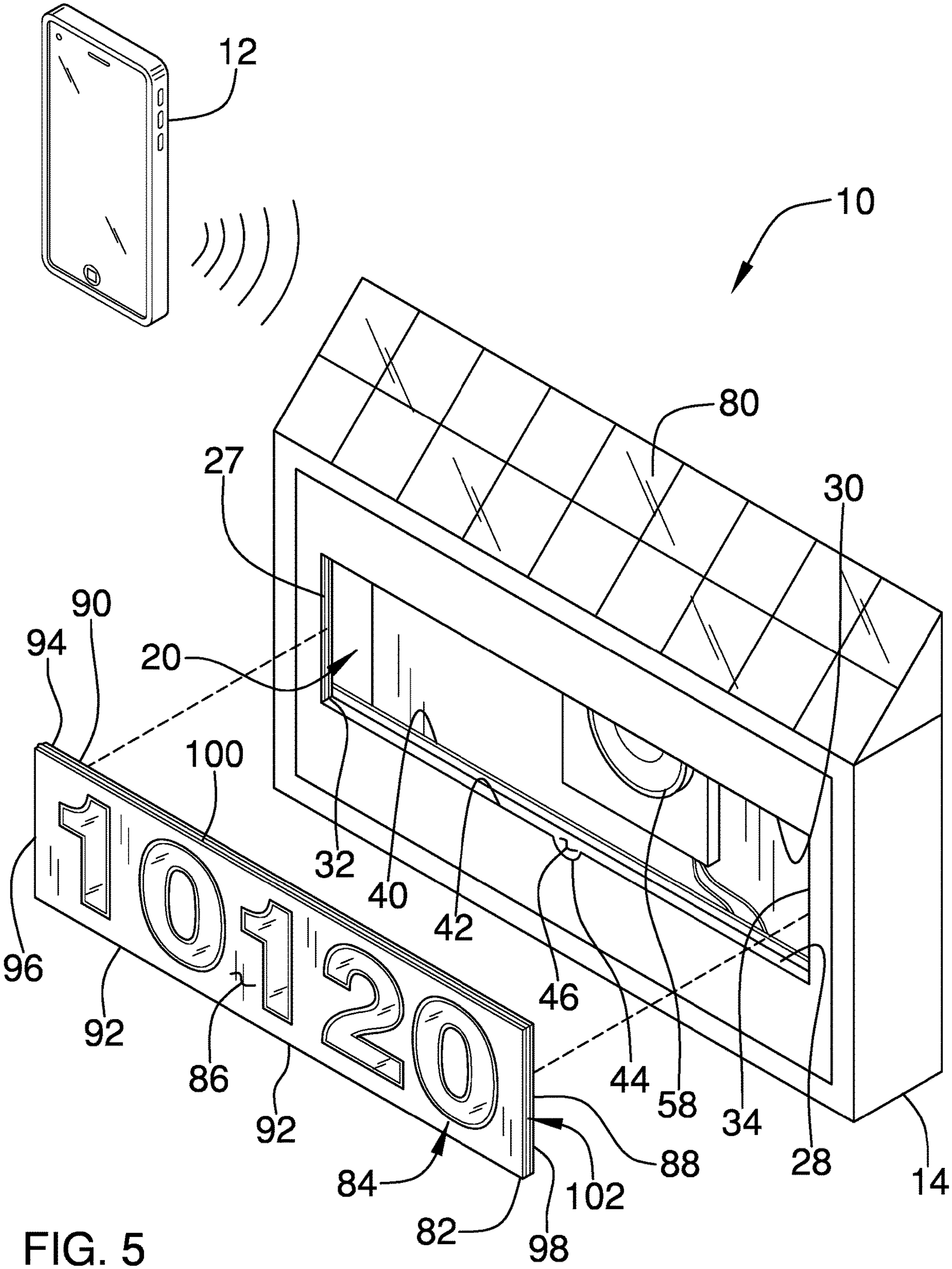
FIG. 5 is an exploded perspective view of an embodiment of the disclosure.
Figure 6:
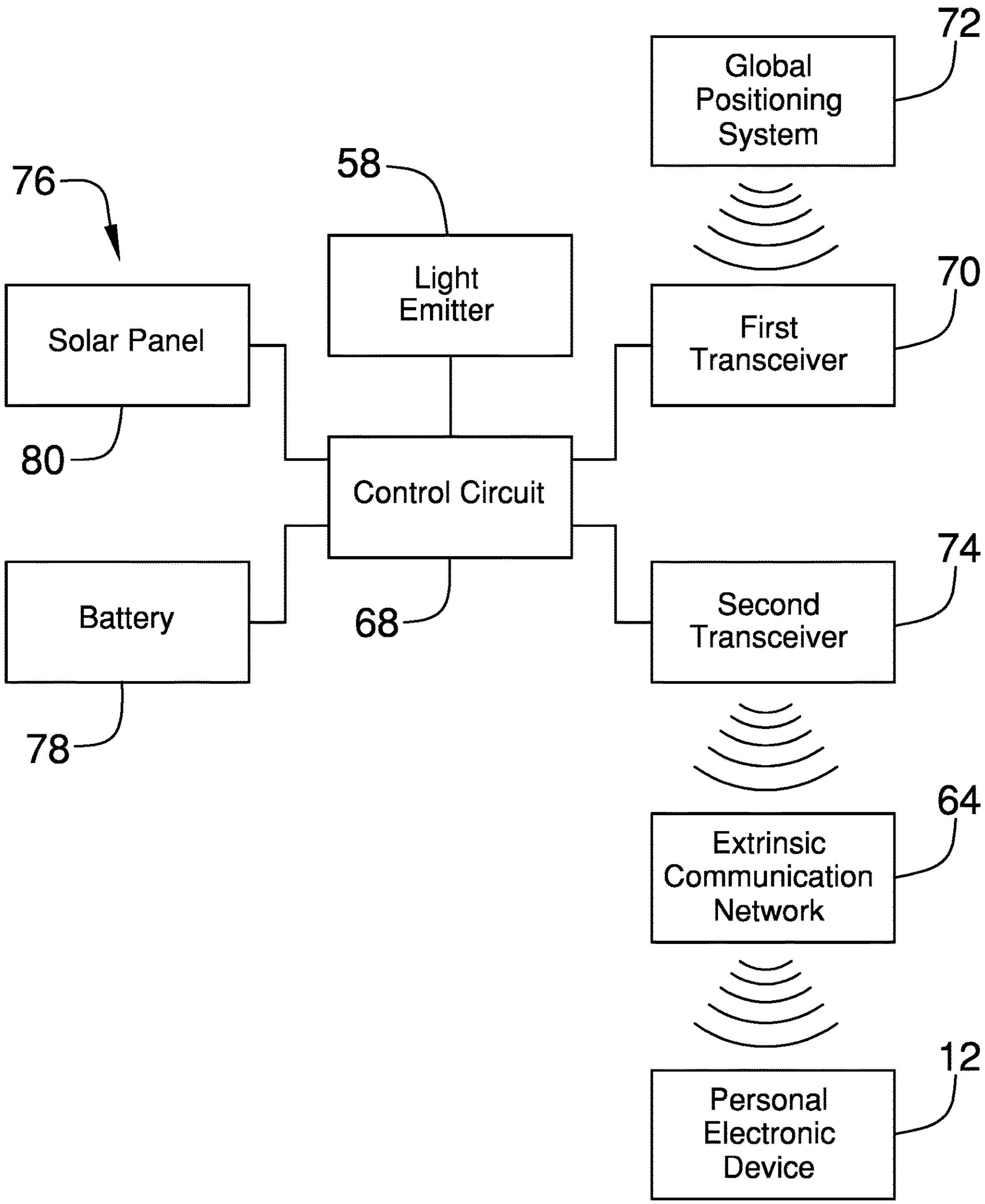
FIG. 6 is a schematic view of an embodiment of the disclosure.

With reference now to the drawings, and in particular to FIGS. 1 through 8 thereof, a new address device embodying the principles and concepts of an embodiment of the disclosure and generally designated by the reference numeral 10 will be described.

As best illustrated in FIGS. 1 through 8, the illuminated address assembly 10 generally comprises a personal electronic device 12 which stores a delivery application and the personal electronic device 12 broadcasts a delivery command. The personal electronic device 12 may comprise a smart phone, an electronic tablet or any other electronic device that has wireless communication capabilities and digital data storage capacity. Additionally, the delivery application may be a smart phone app for ordering a food delivery or any other type of delivery service. A housing 14 is provided that is attachable to an exterior wall 16 of a building 18 such that the housing 14 is visible to an individual approaching the building 18. Furthermore, the housing 14 has an opening 20 that is integrated into the housing 14. The building 18 may be a residence, such as a house or any other building that has a mailing address to which a delivery might be scheduled. Additionally, the building 18 may be located in a neighborhood that includes adjacent buildings, such as houses.

The housing 14 has a back wall 22, a front wall 24 and a top wall 26, and the top wall 26 slopes downwardly between the back wall 22 and the front wall 24. The opening extends through the front wall 24 into an interior of the housing 14 and the opening 20 has a bounding edge 27. The bounding edge 27 has a lower side 28, a top side 30, a first lateral side 32 and a second lateral side 34, and the opening 20 is elongated between the first lateral side 32 and the second lateral side 34. The bounding edge 27 has a groove 36 which is recessed into the top side 30, the first lateral side 32 and the second lateral side 34. The groove 36 has a bounding surface 38 and the bounding surface 38 is concavely arcuate with respect to the bounding edge 27.

The lower side 28 of the bounding edge 27 of the opening 20 has a first portion 40 that is raised with respect to a second portion 42. The second portion 42 is aligned with the front wall 24 of the housing 14 and the second portion 42 has a recess 44 extending downwardly from the second portion 42. The recess 44 has a bounding surface 46 and the bounding surface 46 of the recess 44 is concavely arcuate with respect to the second portion 42 thereby facilitating the recess 44 to accommodate a user's finger. The back wall 22 has a plurality of mounting holes 48 each extending into an interior of the housing 14 and each of the mounting holes 48 has a first portion 50 which has a diameter that is greater than a second portion 52 such that each of the mounting holes 48 has a pear shape. The first portion 50 of the mounting holes 48 insertably receives a head of a fastener, such as a screw or the like, having the second portion 52 of the mounting holes 48 receiving a shaft of the fastener for retaining the housing 14 on the exterior wall 16 of the building 18. The housing 14 has a battery compartment 54 disposed within the interior of the housing 14, the back wall 22 of the housing 14 has a battery opening 56 extending into the battery compartment 54 and a battery cover 55 removably covers the battery compartment 54.

A light emitter 58 is integrated into the housing 14 and the light emitter 58 emits light outwardly from the housing 14 thereby enhancing visibility of the housing 14 to the person approaching the building 18. The light emitter 58 is attached to an inside surface 60 of the back wall 22 of the housing 14 and the light emitter 58 is directed toward the opening 20 in the front wall 24 of the housing 14 to emit light outwardly through the opening 20. The light emitter 58 may comprise a light emitting diode or other type of electronic light emitter or the like.

A communication unit 62 is integrated into the housing 14 and the communication unit 62 is in communication with the light emitter 58. The communication unit 62 is in communication with the personal electronic device 12 such that the communication unit 62 receives a delivery command from the personal electronic device 12. The communication unit 62 is in communication with an extrinsic communication network 64 thereby facilitating the communication unit 62 to be in remote communication with the delivery driver 66. The light emitter 58 is turned on when the delivery driver 66 approaches within a trigger distance of the building 18 and the light emitter 58 is turned off when the delivery driver 66 completes the delivery.

The communication unit 62 comprises a control circuit 68 that is integrated into the housing 14, the control circuit 68 receives an actuate input and a de-actuate input, and the control circuit 68 is electrically coupled to the light emitter 58. The light emitter 58 is turned on when the control circuit 68 receives the actuate input and the light emitter 58 is turned off when the control circuit 68 receives the de-actuate input. The communication unit 62 includes a first transceiver 70 that is integrated into the housing 14 and the first transceiver 70 is electrically coupled to the control circuit 68. The first transceiver 70 is in wireless communication with a global positioning system 72 thereby facilitating the first transceiver 70 to identify the physical location of the building 18 to which the housing 14 is attached. The first transceiver 70 may comprise a radio frequency transceiver or the like and the first transceiver 70 may be in communication with the global positioning system 72 via the internet or a cellular phone network.

The communication unit 62 includes a second transceiver 74 that is integrated into the housing 14 and the second transceiver 74 is electrically coupled to the control circuit 68. The second transceiver 74 is in wireless communication with the extrinsic communication network 64 thereby facilitating the second transceiver 74 to be in wireless communication with the personal electronic device 12. In this way the second transceiver 74 can receive the delivery command from the personal electronic device 12. The second transceiver 74 may comprise a radio frequency transceiver or the like and the extrinsic communication network 64 may comprise the internet or a cellular phone network.

The control circuit 68 analyzes the location of the delivery driver 66 against the physical location of the building 18. The control circuit 68 receives the actuate input when the second transceiver 74 receives the delivery command and the second transceiver 74 receives the location of the delivery driver 66 from the personal electronic device 12. The control circuit 68 receives the actuate input when the control circuit 68 determines that the delivery driver 66 has traveled within the trigger distance of the building 18. The trigger distance may be a distance of no greater than approximately 300.0 meters. Thus, the light emitter 58 is only turned on when the delivery driver 66 approaches the building 18 rather than being turned on the entire time the delivery driver 66 is travelling to the building 18.

The communication unit 62 includes a power supply 76 that is integrated into the housing 14 and the power supply 76 is electrically coupled to the control circuit 68. The power supply 76 comprises a rechargeable battery 78 that is positioned within the battery compartment 54 in the housing 14. The rechargeable battery 78 is electrically coupled to the control circuit 68. The power supply 76 includes a solar panel 80 that is disposed on the top wall 26 of the housing 14 thereby facilitating the solar panel 80 to be exposed to sunlight. The solar panel 80 is electrically coupled to the rechargeable battery 78 for charging the rechargeable battery 78. The control circuit 68 may be wired directly into an electrical system of the building 18 in lieu of the rechargeable battery 78 and the solar panel 80 for electrical power.

A placard 82 is provided that is insertable into the opening 20 in the housing 14 and the placard 82 has indicia 84 that is integrated into the placard 82. The indicia 84 comprise numbers representing an address of the building 18. The indicia 84 are comprised of a translucent material thereby facilitating the light emitter 58 to illuminate the indicia 84.

Figure 7:
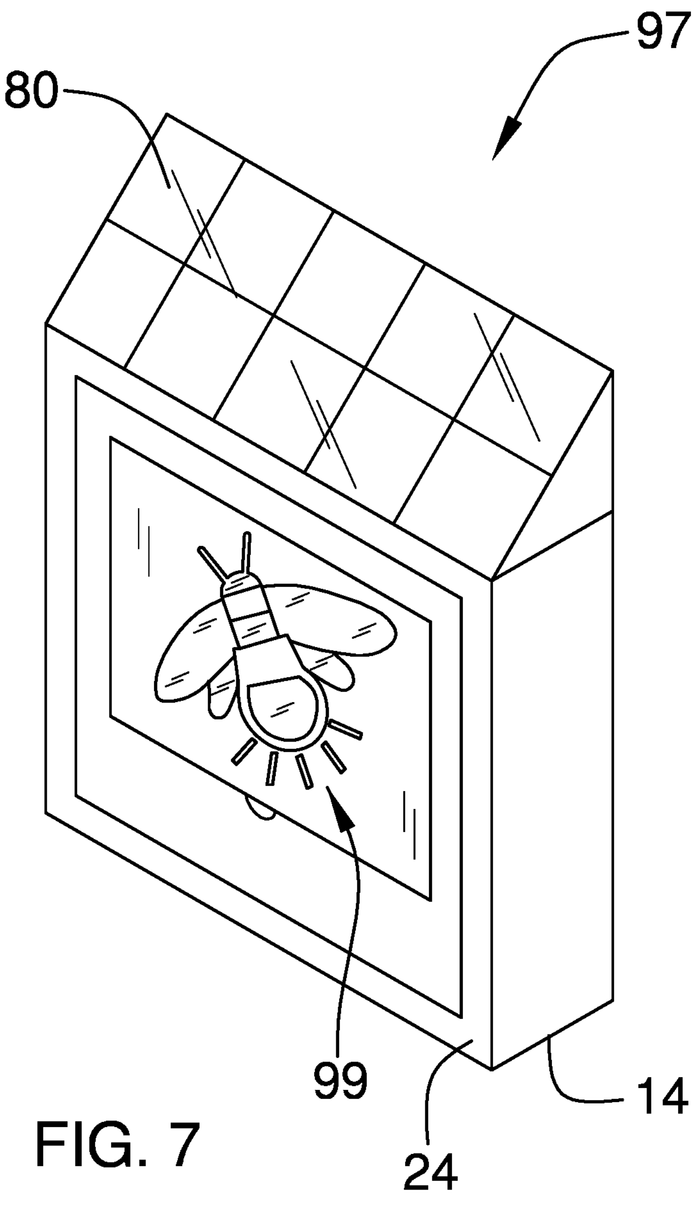
FIG. 7 is a perspective view of an alternative embodiment of the disclosure.
Figure 8:
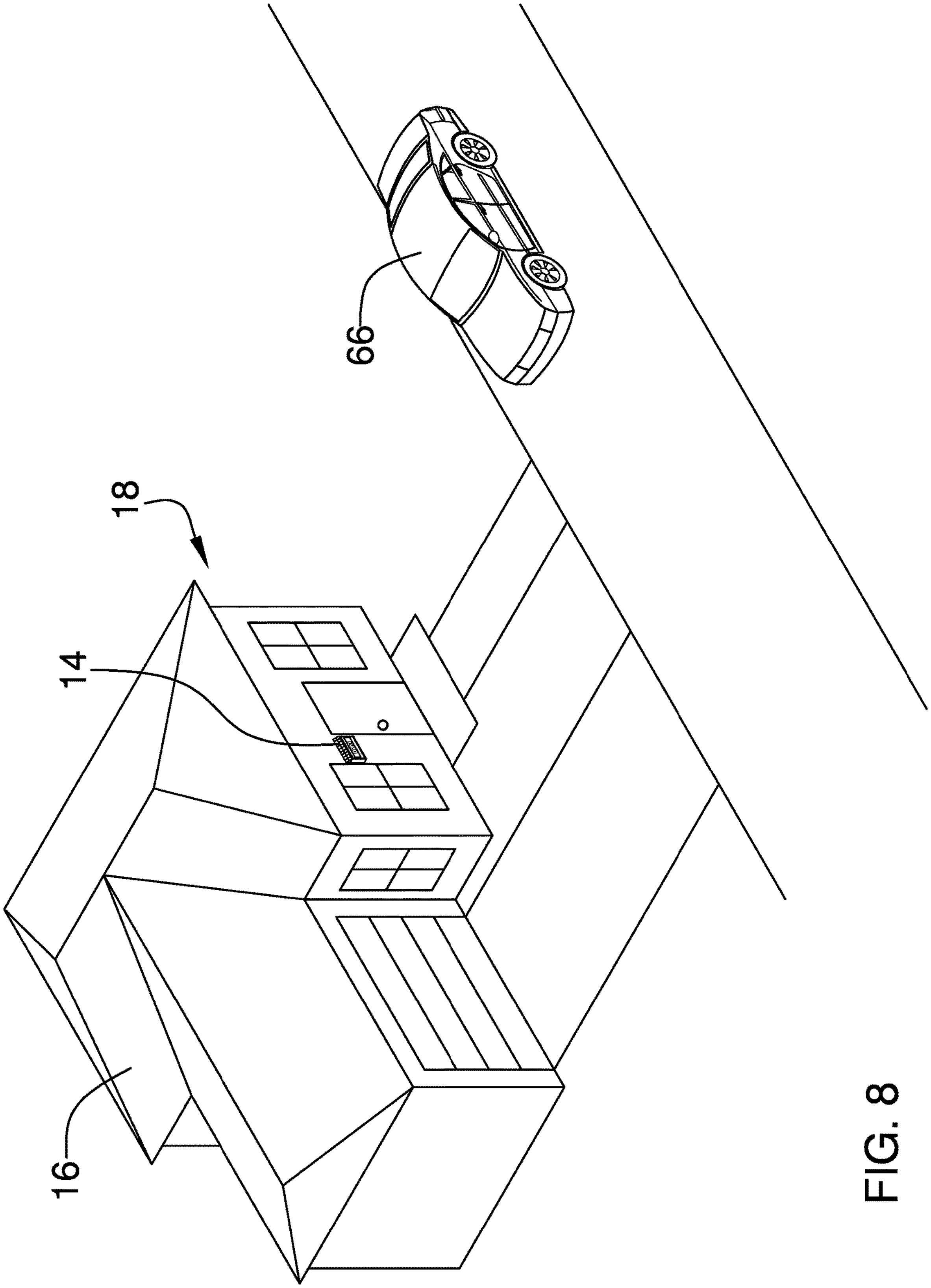
FIG. 8 is a perspective in-use view of an embodiment of the disclosure.

Additionally, the placard 82 is comprised of an opaque material thereby inhibiting light from passing through the placard 82 with the exception of the indicia 84. In this way the placard 82 facilitates the individual approaching the building 18 to read the address of the building 18. The placard 82 has a front surface 86, a back surface 88 and a perimeter edge 90 extending between the front surface 86 and the back surface 88, and the perimeter edge 90 has a lower side 92, an upper side 94, a first lateral side 96 and a second lateral side 98. In an alternative embodiment 97 as is shown in FIG. 7, the indicia 84 may comprise an ornamental image 99, such as a firefly for example, that is pleasing to look at.

The placard 82 has a lobe 100 extending away from the perimeter edge 90 and the lobe 100 extends along each of the upper side 94 and the first lateral side 96 and the second lateral side 98 of the perimeter edge 90. The perimeter edge 90 has a groove 102 extending into the lower side 92 of the perimeter edge 90 and the groove 36 in the perimeter edge 90 extends between the first lateral side 96 and the second lateral side 98 of the perimeter edge 90. The groove 36 in the perimeter edge 90 is aligned with the back surface 88 and the lobe 100 extends into the groove 36 in the bounding edge 27 of the opening 20 in the housing 14.

The lobe 100 is convexly arcuate with respect to the perimeter edge 90 such that the lobe 100 conforms to the bounding surface 38 of the groove 36 in the bounding edge 27 of the opening 20. The first portion 40 of the lower side 28 of the bounding edge 27 of the opening 20 extends into the groove 36 in the lower side 92 of the perimeter edge 90 of the placard 82. Additionally, the recess 44 in the second portion 42 of the lower side 28 of the bounding edge 27 of the opening 20 in the housing 14 facilitates the lower side 92 of the perimeter edge 90 of the placard 82 to be gripped for removing the placard 82 from the opening 20.

In use, the light emitter 58 is turned on when the delivery driver 66 approaches within the trigger distance of the building 18. In this way the indicia 84 on the placard 82 is illuminated so the delivery driver 66 can clearly read the address of the building 18 when the delivery driver 66 approaches the building 18. Additionally, the light emitter 58 has a sufficiently low intensity to inhibit neighbors from being disturbed by light from the light emitter 58 such as commonly happens with porch lights or security lights. The light emitter 58 is turned off once reception of the food delivery has been confirmed with the food delivery application in the personal electronic device 12. Additionally, the light emitter 58 is turned on anytime the personal electronic device 12 is employed to call 911 for emergency assistance thereby ensuring that first responders can clearly see the address of the building 18. The housing 14 can be transferred to a different building when the owner of the housing 14 relocates, for example.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated address assembly for illuminating the address of a building thereby enhancing visibility of the address of the building for first responders and delivery drivers, said assembly comprising:

a personal electronic device storing a delivery application, said personal electronic device broadcasting a delivery command;

a housing being attachable to an exterior wall of a building such that said housing is visible to an individual approaching the building, said housing having an opening being integrated into said housing;

a light emitter being integrated into said housing, said light emitter emitting light outwardly from said housing thereby enhancing visibility of said housing to the person approaching the building;

a communication unit being integrated into said housing, said communication unit being in communication with said light emitter, said communication unit being in communication with said personal electronic device such that said communication unit receives a delivery command from said personal electronic device, said communication unit being in communication with an extrinsic communication network thereby facilitating said communication unit to be in remote communication with the delivery driver, said light emitter being turned on when the delivery driver travels within a trigger distance of the building to facilitate the delivery driver to visually identify the building as the destination for the delivery, said light emitter being turned off when the delivery driver completes the delivery to the building;

a placard being insertable into said opening in said housing, said placard having indicia being integrated into said placard, said indicia comprising numbers representing an address of the building, said indicia being comprised of a translucent material thereby facilitating said light emitter to illuminate said indicia wherein said placard is configured to facilitate the individual approaching the building to read the address of the building;

wherein said housing has a back wall, a front wall and a top wall, said top wall sloping downwardly between said back wall and said front wall, said opening extending through said front wall into an interior of said housing, said opening having a bounding edge, said bounding edge having a lower side, a top side, a first lateral side and a second lateral side, said opening being elongated between said first lateral side and said second lateral side;

wherein said bounding edge has a groove being recessed into said top side and said first lateral side and said second lateral side, said groove having a bounding surface, said bounding surface being concavely arcuate with respect to said bounding edge;

wherein said lower side of said bounding edge of said opening has a first portion being raised with respect to a second portion, said second portion being aligned with said front wall of said housing;

wherein said second portion has a recess extending downwardly from said second portion, said recess having a bounding surface, said bounding surface of said recess being concavely arcuate with respect to said second portion thereby facilitating said recess to accommodate a user's finger;

wherein said back wall has a plurality of mounting holes each extending into an interior of said housing, each of said mounting holes having a first portion having a diameter being greater than a second portion such that each of said mounting holes has a pear shape thereby facilitating said first portion to insertably receive a head of a fastener having said second portion receiving a shaft of the fastener for retaining said housing on the exterior wall of the building; and wherein said housing has a battery compartment being disposed within said interior of said housing, said back wall of said housing having a battery opening extending into said battery compartment.

2. The assembly according to claim 1, wherein said light emitter is attached to an inside surface of said back wall of said housing, said light emitter being directed toward said opening in said front wall of said housing to emit light outwardly through said opening.

3. An illuminated address assembly for illuminating the address of a building thereby enhancing visibility of the address of the building for first responders and delivery drivers, said assembly comprising:

a personal electronic device storing a delivery application, said personal electronic device broadcasting a delivery command;

a housing being attachable to an exterior wall of a building such that said housing is visible to an individual approaching the building, said housing having an opening being integrated into said housing;

a light emitter being integrated into said housing, said light emitter emitting light outwardly from said housing thereby enhancing visibility of said housing to the person approaching the building;

a communication unit being integrated into said housing, said communication unit being in communication with said light emitter, said communication unit being in communication with said personal electronic device such that said communication unit receives a delivery command from said personal electronic device, said communication unit being in communication with an extrinsic communication network thereby facilitating said communication unit to be in remote communication with the delivery driver, said light emitter being turned on when the delivery driver travels within a trigger distance of the building to facilitate the delivery driver to visually identify the building as the destination for the delivery, said light emitter being turned off when the delivery driver completes the delivery to the building;

a placard being insertable into said opening in said housing, said placard having indicia being integrated into said placard, said indicia comprising numbers representing an address of the building, said indicia being comprised of a translucent material thereby facilitating said light emitter to illuminate said indicia wherein said placard is configured to facilitate the individual approaching the building to read the address of the building; and wherein said communication unit comprises:

a control circuit being integrated into said housing, said control circuit receiving an actuate input, said control circuit receiving a de-actuate input, said control circuit being electrically coupled to said light emitter, said light emitter being turned on when said control circuit receives said actuate input, said light emitter being turned off when said control circuit receives said de-actuate input;

a first transceiver being integrated into said housing, said first transceiver being electrically coupled to said control circuit, said first transceiver being in wireless communication with a global positioning system thereby facilitating said first transceiver to identify the physical location of the building to which said housing is attached;

a second transceiver being integrated into said housing, said second transceiver being electrically coupled to said control circuit, said second transceiver being in wireless communication with an extrinsic communication network thereby facilitating said second transceiver to be in wireless communication with said personal electronic device such that said second transceiver receives said delivery command from the personal electronic device, said second transceiver receiving the location of the delivery driver from said personal electronic device, said control circuit analyzing the location of the delivery driver against the physical location of the building, said control circuit receiving said actuate input when said control circuit determines that the delivery driver has traveled within the trigger distance of the building, said control circuit receiving said de-actuate input when the delivery driver has completed the delivery to the building; and a power supply being integrated into said housing, said power supply being electrically coupled to said control circuit, said power supply comprising:

a rechargeable battery being positioned within said battery compartment in said housing, said rechargeable battery being electrically coupled to said control circuit; and a solar panel being disposed on said top wall of said housing thereby facilitating said solar panel to be exposed to sunlight, said solar panel being electrically coupled to said rechargeable battery for charging said rechargeable battery.

4. An illuminated address assembly for illuminating the address of a building thereby enhancing visibility of the address of the building for first responders and delivery drivers, said assembly comprising:

a personal electronic device storing a delivery application, said personal electronic device broadcasting a delivery command;

a housing being attachable to an exterior wall of a building such that said housing is visible to an individual approaching the building, said housing having an opening being integrated into said housing;

a light emitter being integrated into said housing, said light emitter emitting light outwardly from said housing thereby enhancing visibility of said housing to the person approaching the building;

a communication unit being integrated into said housing, said communication unit being in communication with said light emitter, said communication unit being in communication with said personal electronic device such that said communication unit receives a delivery command from said personal electronic device, said communication unit being in communication with an extrinsic communication network thereby facilitating said communication unit to be in remote communication with the delivery driver, said light emitter being turned on when the delivery driver travels within a trigger distance of the building to facilitate the delivery driver to visually identify the building as the destination for the delivery, said light emitter being turned off when the delivery driver completes the delivery to the building;

a placard being insertable into said opening in said housing, said placard having indicia being integrated into said placard, said indicia comprising numbers representing an address of the building, said indicia being comprised of a translucent material thereby facilitating said light emitter to illuminate said indicia wherein said placard is configured to facilitate the individual approaching the building to read the address of the building;

wherein said placard has a front surface, a back surface and a perimeter edge extending between said front surface and said back surface, said perimeter edge having a lower side, an upper side, a first lateral side and a second lateral side;

wherein said placard has a lobe extending away from said perimeter edge, said lobe extending along each of said upper side and said first lateral side and said second lateral side; and wherein said perimeter edge has a groove extending into said lower side, said groove in said perimeter edge extending between said first lateral side and said second lateral side, said groove in said perimeter edge being aligned with said back surface.

5. The assembly according to claim 4, wherein said opening in said housing has a bounding edge, said bounding edge having a bounding surface, bounding edge having a groove integrated into said bounding edge, said groove in said bounding edge having a bounding surface, said bounding edge having a lower side, said lower side having a first portion and a second portion, said second portion having a recess;

said lobe extends into said groove in said bounding edge of said of said opening in said housing, said lobe being convexly arcuate with respect to said perimeter edge such that said lobe conforms to said bounding surface of said groove in said bounding edge of said opening.

6. The assembly according to claim 5, wherein said first portion of said lower side of said bounding edge of said opening extends into said groove in said lower side of said perimeter edge of said placard, said recess in said second portion of said lower side of said bounding edge of said opening in said housing facilitating said lower side of said perimeter edge of said placard to be gripped for removing said placard from said opening.

7. The assembly according to claim 4, further comprising:

said housing having a back wall, a front wall and a top wall, said top wall sloping downwardly between said back wall and said front wall, said opening extending through said front wall into an interior of said housing, said opening having a bounding edge, said bounding edge having a lower side, a top side, a first lateral side and a second lateral side, said opening being elongated between said first lateral side and said second lateral side, said bounding edge having a groove being recessed into said top side and said first lateral side and said second lateral side, said groove having a bounding surface, said bounding surface being concavely arcuate with respect to said bounding edge, said lower side of said bounding edge of said opening having a first portion being raised with respect to a second portion, said second portion being aligned with said front wall of said housing, said second portion having a recess extending downwardly from said second portion, said recess having a bounding surface, said bounding surface of said recess being concavely arcuate with respect to said second portion thereby facilitating said recess to accommodate a user's finger, said back wall having a plurality of mounting holes each extending into an interior of said housing, each of said mounting holes having a first portion having a diameter being greater than a second portion such that each of said mounting holes has a pear shape thereby facilitating said first portion to insertably receive a head of a fastener having said second portion receiving a shaft of the fastener for retaining said housing on the exterior wall of the building, said housing having a battery compartment being disposed within said interior of said housing, said back wall of said housing having a battery opening extending into said battery compartment;

said light emitter being attached to an inside surface of said back wall of said housing, said light emitter being directed toward said opening in said front wall of said housing to emit light outwardly through said opening;

said communication unit comprising:

a control circuit being integrated into said housing, said control circuit receiving an actuate input, said control circuit receiving a de-actuate input, said control circuit being electrically coupled to said light emitter, said light emitter being turned on when said control circuit receives said actuate input, said light emitter being turned off when said control circuit receives said de-actuate input;

a first transceiver being integrated into said housing, said first transceiver being electrically coupled to said control circuit, said first transceiver being in wireless communication with a global positioning system thereby facilitating said first transceiver to identify the physical location of the building to which said housing is attached;

a second transceiver being integrated into said housing, said second transceiver being electrically coupled to said control circuit, said second transceiver being in wireless communication with an extrinsic communication network thereby facilitating said second transceiver to be in wireless communication with said personal electronic device such that said second transceiver receives said delivery command from the personal electronic device, said second transceiver receiving the location of the delivery driver from said personal electronic device, said control circuit analyzing the location of the delivery driver against the physical location of the building, said control circuit receiving said actuate input when said control circuit determines that the delivery driver has traveled within the trigger distance of the building, said control circuit receiving said de-actuate input when the delivery driver has completed the delivery to the building; and a power supply being integrated into said housing, said power supply being electrically coupled to said control circuit, said power supply comprising:

a rechargeable battery being positioned within said battery compartment in said housing, said rechargeable battery being electrically coupled to said control circuit; and a solar panel being disposed on said top wall of said housing thereby facilitating said solar panel to be exposed to sunlight, said solar panel being electrically coupled to said rechargeable battery for charging said rechargeable battery; and said lobe extending into said groove in said bounding edge of said of said opening in said housing, said lobe being convexly arcuate with respect to said perimeter edge such that said lobe conforms to said bounding surface of said groove in said bounding edge of said opening, said first portion of said lower side of said bounding edge of said opening extending into said groove in said lower side of said perimeter edge of said placard, said recess in said second portion of said lower side of said bounding edge of said opening in said housing facilitating said lower side of said perimeter edge of said placard to be gripped for removing said placard from said opening.

* * * * *